Oct. 18, 1938.                    L. EMANUELI                    2,133,382
HIGH TENSION ELECTRIC CABLE
Original Filed May 22, 1929
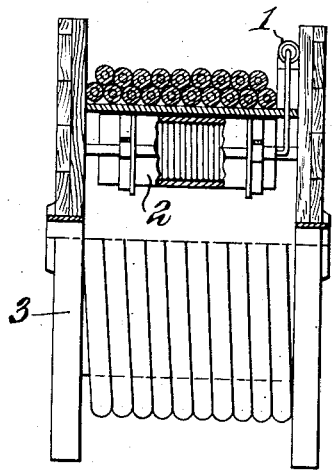
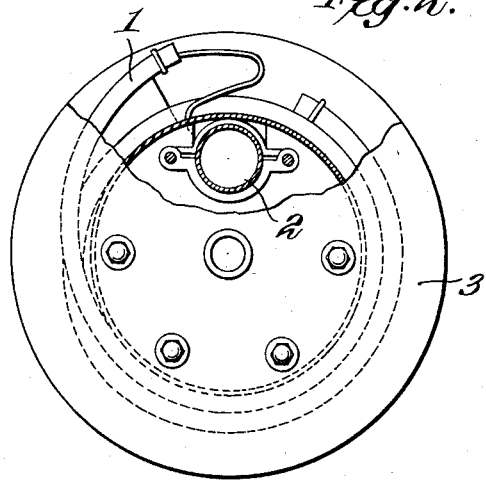
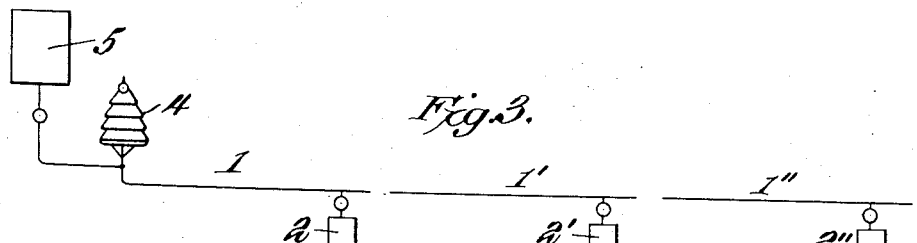
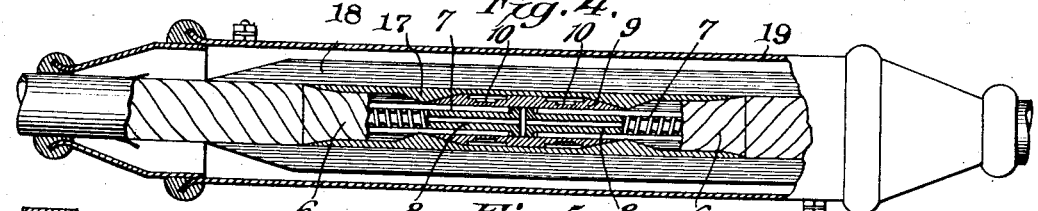
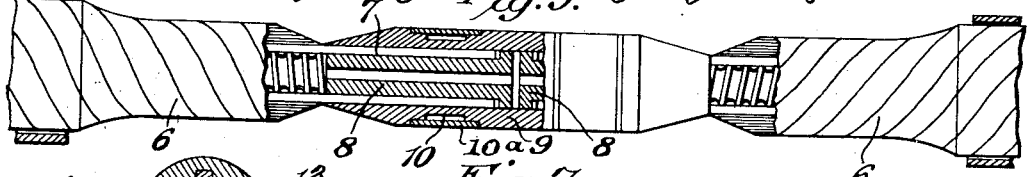
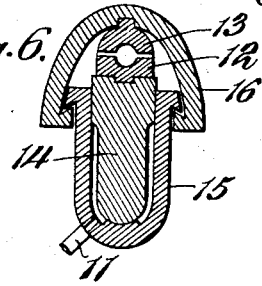
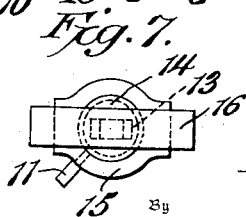
Inventor,
Luigi Emanueli,
By Emil Bonnelycke
Attorney Patented Oct. 18, 1938

2,133,382

UNITED STATES PATENT OFFICE 2,133,382

HIGH TENSION ELECTRIC CABLE

Luigi Emanueli, Milan, Italy, assignor to Società Italiana Pirelli, Milan, Italy Original application May 22, 1929, Serial No. 365,111. Divided and this application April 21, 1931, Serial No. 531,788. In Great Britain January 20, 1928

26 Claims. (Cl. 173—268)

The present application is a division of my prior application Serial No. 365,111, filed May 22, 1929, which has matured to Patent No. 2,081,880, dated May 25, 1937, and which in turn is a continuation in part of application Serial No. 319,100, filed November 13, 1928.

This invention relates to the laying and jointing of electric cables of the type provided in their interior with a longitudinal channel or channels filled with oil or fluid insulating compound, the channels being placed in communication at predetermined distances along the cable with feeding tanks containing oil or fluid insulating compound.

With oil-filled cables of the type above referred to, the lengths of cable after they had been laid could not be jointed with the cable already filled with oil, since the oil would flow out from the ends to be jointed, thus rendering impossible the operation of soldering the socket connecting the conductors of the adjacent cable ends. This necessitated the joining being done with the cable empty of oil and the impregnation being effected afterwards, so that the cable had to be impregnated after it had been laid, an operation involving the use of vacuum pumps, and which, moreover, is very long, cumbersome and costly.

The present invention has for its object to overcome the difficulties referred to above and to avoid having to impregnate the cable after it has been laid. For this purpose, according to the invention, the cable is laid in the impregnated condition and already filled with oil, each length of impregnated cable as sent out from the factory being connected with a variable capacity reservoir as described in the above mentioned prior application Serial No. 365,111, and the two conductors of the adjacent cable ends to be joined are connected together mechanically without soldering them, thus avoiding any trouble from flowing oil. This operation is preferably effected by connecting together the conductors with a socket which is pressed firmly in position on the conductors by means of a vise. The jointing operation is then completed in the ordinary way by the application of layers of insulating material on to the joined conductors and the application of a protective sleeve. During these operations the oil, which flows from the adjacent ends of the two cable lengths and which serves to impregnate and completely fill the joint, is provided by the reservoirs attached to the two lengths of cable, and the quantity of oil contained in the cable remains unchanged.

The procedure above described serves both for single conductor cables and for cables with more than one conductor and, furthermore, can be applied to every type of cable with internal longitudinal channels, be these situated in the conductors or in the thickness of the insulation, or between the insulation and the lead sheath, or in the spaces between the cores of cables with more than one conductor. It is desirable, however, by means of any convenient practicable methods (binding, plugging, etc.) to limit somewhat the flow of the oil from the adjacent ends of the two cable lengths until the two conductors of the cable are completely jointed by means of the sockets and the application of the layers of insulating material, because the flow, even if it is not a hindrance during the application of the sockets, might in some cases exhaust the amount of oil in the reservoirs.

The procedure according to the present invention can be adopted with all types of joint, that is, with paper or fibre insulation, formed by tapes or rolls, and wrapped by hand or by machine, and also with the stop-joint type of joint, in which the oil contained in one section of the cable cannot flow into the adjacent section so that the continuity of the oil is broken between the two lengths of cable which are joined.

The described procedure is applicable also to the terminals of the cable, including also in this case the connections made without soldering by means of a socket pressed tightly on the conductors.

In order that the said invention may be clearly understood and readily carried into effect, the same will now be described more fully with reference to the accompanying drawing, in which:

Figures 1 and 2 illustrate diagrammatically in part sectional elevation and side view, respectively, a shipping drum carrying a length of cable and its attached reservoir.

Figure 3 is a diagrammatic view of three lengths or cable already laid but not yet connected up with another.

Figure 4 is a sectional view of the completed joint between two lengths of cable.

Figure 5 is a side view, partly in section, of the finished joint between the conductors of the two cable lengths, and Figures 6 and 7 illustrate in vertical section and plan a vise for compressing the socket used in making the joint.

To one end of each length of cable 1 there is attached a small variable capacity reservoir 2, while the other end of the said cable length is provided with the usual temporary cap (not indicated in the drawing), the cable and its attached reservoir being conveniently arranged on a shipping drum 3 (see Figs. 1 and 2), all as more fully described in said prior application Serial No. 365,111.

The lengths of cable 1, 1¹, 1¹¹ (see Fig. 3) are already filled with oil, each length being connected with its respective small feeding or compensating reservoir 2, 2¹, 2¹¹, which has kept it completely impregnated after leaving the factory and during transit. The reservoir connected to each cable length is kept attached thereto during the installation of the cable, thereby keeping the cable perfectly saturated with the oil or other insulating compound and under a pressure greater than that of the surrounding atmosphere, from the time when it is laid in the desired position until the jointing operations can be started. When the terminal 4 connected to a large feeding tank 5 filled with oil or another fluid insulating compound is attached to the end of cable section 1, the small reservoir 2 attached to the other end of this section can be removed and the jointing effected between cable sections 1 and 1¹. During the operation of jointing, a flow of oil through the cable lengths 1 and 1¹ is maintained by the reservoirs 5 and 2¹, the oil which leaks out from the cable end during the jointing operations at the joint where the joint is made ensuring the non-entrance of air into the cable, so that no further impregnation thereof is necessary. After sections 1 and 1¹ have been jointed, the small reservoir 2¹ can be removed and the jointing effected between sections 1¹ and 1¹¹, the flow of oil therethrough during the jointing being maintained by the reservoirs 5 and 2¹¹ and so on for all the various lengths of cable to be connected. If the capacity of the small reservoir, as attached to each length of cable when sent out from the factory, is not sufficient to ensure a flow of oil through the cable length in question during the time required in the formation of the joint with the adjacent cable length, a larger reservoir may be substituted.

In making the joint, where hollow conductors are employed, (see Fig. 4), the insulation 6 is stripped off the ends of the two conductors 7 to be joined and into the cavity within each of the conductors a piece of steel tubing 8, preferably having a restricted bore, and relatively thick walls, as shown, is introduced, while the ends of the conductors in their turn are introduced into a tubular socket or sleeve 9, made of copper for example, which latter is compressed very firmly in a vise so that it becomes deeply dented at several places 10 (see Fig. 5) along its length at points overlying the tubes 8, whereby the conductors are clamped between said tubes and sleeve and a perfect electrical connection of the two conductors without soldering is ensured. The relatively small bore of the tubing 8 serves to restrict the flow and reduce the loss of oil during the jointing operation. After the compression of the sleeve or socket 9 has been made at the points 10, the surface at these points will be rough and indented, and this may be dangerous from an electrical standpoint. For this reason, these rough places are preferably covered by means of a thin metal ring or cuff 10ᵃ, as shown in Fig. 5. The completion of the joint is then effected in any of the usual ways, as for example, by the application of layers 17 and 18 of insulating material on to the joined conductors and the final application of a protective metal casing 19, soldered to the lead sheaths. The vise for compressing the socket (see Figs. 6 and 7) may conveniently be actuated by a small hydraulic press operated through a tube 11 connected therewith. The socket to be compressed is inserted between the two jaws 12 and 13 of the vise, of which the lower jaw is movable and can be raised and pressed against the upper jaw 13 by the piston or ram 14, which slides in the pump chamber 15. The upper jaw 13 is kept in a fixed position by the member 16 attached to the body of the press.

The joint itself may be impregnated, with or without a vacuum treatment. The former method ensures a somewhat better result and may be carried out by using a pump which removes the air present in the joint in a time shorter than that taken by the oil, coming from the cable, to fill it. The flow of oil may be controlled by suitable restrictors fitted in the reservoirs or compensators connected to the various cable sections.

As previously mentioned, the joints may be either of the usual type used in ordinary cables or of the stop-joint type, which latter are so designed that the oil contained in one section of the cable cannot flow into the adjacent section. A stop-joint may limit both a length of cable with no ordinary joint inserted, or a length of cable in which one or more ordinary joints are inserted. The construction of this latter type of joint can be varied considerably as to many of its details, some instances of joints of this kind being described for example in prior patents, as for example, Patent No. 1,698,051.

I claim as my invention:—

1. The method of making and installing lengths of sheathed cable filled with fluid under pressure which comprises sealing the ends of each length against the escape of fluid, connecting an external fluid containing reservoir to the interior of each length, installing the lengths of cable in their respective places, openings sheaths of the adjacent ends of a pair of lengths, uniting the current-conducting parts while fluid is flowing from the sheaths of the cable lengths, and subsequently finishing the joint.

2. The method of making and installing sheathed cable, which comprises forming the cable in convenient lengths, filling each length with impregnating fluid, attaching to each length a fluid-filled reservoir which maintains a pressure within the sheaths superior to that of the atmosphere, installing the lengths of cable in their respective places, opening the sheaths at the adjacent ends of a pair of lengths, and while fluid is flowing from the cable lengths, due to the action of the reservoirs, mechanically uniting the conductors of the lengths to establish an electrical connection and to stop the free flow of fluid, and subsequently finishing the joint.

3. A method of making and installing sheathed cable, which comprises forming the cable in convenient lengths, filling each length with fluid and independently maintaining the same under pressure, installing the lengths in their respective places, opening the sheaths of adjacent cable lengths, and while fluid is flowing from both ends mechanically uniting the conductors and stopping the free flow of fluid, insulating the joint thus formed, enclosing the same in a casing which is connected fluid-tight to the sheaths, and evacuating the casing.

4. A method of making and installing sheathed cable, which comprises forming the cable in lengths of cable, filling the same with fluid under pressure, attaching a small reservoir to each length, installing the lengths of cable in their respective positions, connecting a relatively large feeding tank containing fluid to the free end of the first length, opening the sheaths of adjacent lengths in succession and while the fluid is flowing uniting the conductors thereof and stopping the flow of fluid, and successively removing the small reservoirs.

5. A method of connecting the adjacent ends of two insulated electric cable lengths which have hollow conductors containing fluid under a pressure superior to that of the atmosphere, which comprises removing the insulation from and opening the adjacent ends of the lengths of cable, inserting a tubular member having a reduced bore into the end of each conductor while fluid is escaping therefrom, to restrict the fluid flow, mounting a tubular connector over the exposed ends of the conductors, and subjecting the connector to heavy radial pressure to firmly unite the same with the conductors.

6. The method of connecting the adjacent ends of two electric cable lengths which have hollow conductors containing fluid under pressure, which comprises opening the adjacent ends of the cables, so as to permit the fluid to flow out, inserting a tubular means having a small bore within the conductors while fluid is escaping therefrom, surrounding the adjacent ends of the conductors with a tubular connector, and subjecting the connector to heavy compression pressure at points overlying the first tubular means to firmly clamp the conductors between the said first tubular means and the connector to establish electrical connection and stop the flow of fluid.

7. The combination with a pair of hollow electrical conductors which contain fluid under pressure, of a separate tubular member having a restricted bore mounted within the end of each conductor, and serving to reduce the flow of fluid therefrom, before the conductors are joined, the ends of said tubular members being disposed in abutting relation, and a sleeve arranged to embrace the portions of the conductors about the said members and which is compressed thereon at points intermediate its ends and overlying said hollow conductors and said members so as to unite the said parts.

8. A joint for electric cables having an enclosing sheath and insulated hollow conductors, comprising a pair of separate tubular members of an outside diameter substantially equal to the inside diameter of said hollow conductors and having relatively thick walls providing a restricted bore, which members are located in the adjacent ends of the conductors, a sleeve which surrounds said ends of the conductors and overlies both said tubular members, said sleeve being radially compressed at points intermediate its ends to such extent that it is indented, and thus clamps the conductors between it and the said members under heavy pressure to establish electrical connection, a covering of insulation for the sleeve and adjacent parts of the conductors, and a casing which encloses the joint and is sealed to the sheaths at its ends.

9. The method of connecting the adjacent ends of sections of an electric cable having a channel containing fluid maintained under pressure, which comprises opening the ends of the cable sections and permitting the fluid to flow out, substantially restricting such flow, and then while the fluid is still flowing, mechanically uniting the parts so as to prevent further escape of fluid.

10. The method of connecting the adjacent ends of sections of an electric cable having a conductor, a closed impervious sheath and a longitudinally extending channel containing insulating fluid, which comprises opening the ends of the cable sections so as to permit the fluid to flow out, maintaining such flow of fluid from both sections, and while the fluid is flowing, electrically connecting the adjacent conductor ends and closing the open ends of the channel.

11. In the carrying on of connecting or repairing operations on an electric cable having an impervious sheath, and a longitudinally extending channel containing insulating fluid, the method of preventing the ingress of air into the cable which comprises opening the cable in air to permit the fluid to flow out, continuously maintaining such flow of fluid, and performing the entire operation in air while the fluid is flowing.

12. The method of attaching a metallic connector sleeve to the end of an insulated electric cable having a hollow conductor containing fluid under a pressure superior to that of the atmosphere, which method comprises removing the insulation from and opening the end of the cable, inserting a tubular member having a reduced bore into the end of the conductor while fluid is escaping therefrom, to restrict the fluid flow, placing the connector sleeve over the exposed end of the conductor, and subjecting said connector sleeve to heavy radial pressure to firmly unite the same with the conductor.

13. The method of attaching a metallic connector sleeve to the end of an insulated electric cable having a hollow conductor containing fluid under pressure, which comprises opening the end of the cable so as to permit the fluid to flow out, iserting a strong tubular means having a small bore within the end of the conductor while fluid is escaping therefrom, placing the connector sleeve over the end of the conductor, and subjecting said connector sleeve to heavy radial pressure at a point overlying said tubular means to firmly clamp the conductor between the strong tubular means and the connector, to establish electrical connection and stop the flow of fluid.

14. The method of making a joint between two adjacent lengths of oil filled cable having longitudinal oil ducts, which comprises opening the adjacent ends of the cables while maintaining the cables full of oil, establishing an electrical connection between the cable conductors and a physical connection for communication between the cable ducts, flushing the connected ends of the cables, and completing the insulation of the joint while maintaining the remote ends of the cable lengths under oil pressure above atmospheric pressure.

15. The method of making a joint between two adjacent lengths of oil filled cable having longitudinal oil ducts, which comprises opening the adjacent ends of the cables while maintaining the cables full of oil, establishing an electrical connection between the cable conductors and a connection for communication between the cable ducts, establishing an outward flow of oil from said ducts at the connection to flush the portion of the ducts adjacent the connection of any air that may have entered, then stopping said outward flow and completing the insulation of the joint.

16. The method of making a joint between two adjacent lengths of fluid filled cable having longitudinal fluid ducts, which comprises opening the adjacent ends of the cables while maintaining the cables full of fluid, permitting the fluid to flow from the adjacent ends of the two cables under the influence of pressure on the fluid at the remote ends of the cable lengths above atmospheric pressure, and thereafter establishing an electrical connection between the cable conductors and a physical connection for communication between the cable ducts.

17. In the method of installing a length of sheathed cable filled with insulating fluid and having an external reservoir containing such fluid connected to one end thereof so as to create a pressure within the sheath of the cable superior to that of the atmosphere, those steps which consist in installing said cable length in place, and then opening the end of the cable length remote from said reservoir, permitting a flow of fluid under pressure of the reservoir from the opened end of the cable while maintaining the cable length filled with the fluid, and thereafter joining the last mentioned end of the cable length to another length of such fluid filled cable.

18. The method of making a joint between two adjacent lengths of fluid filled cable having longitudinal fluid ducts, which comprises opening the adjacent ends of the cables while maintaining the cables full of fluid and with pressure above atmospheric pressure on the fluid at the remote ends of the cable lengths, permitting the fluid to flow from the opened ends of the two cables under the influence of such pressure, preparing the conductor ends for joining while the fluid is still so flowing, and thereafter joining the conductor ends.

19. In the method of installing a length of sheathed cable filled with insulating fluid and having an external reservoir containing such fluid connected to one end thereof so as to create a pressure within the sheath of the cable superior to that of the atmosphere, those steps which consist in installing said cable length in place, and then opening the end of the cable length remote from said reservoir, permitting a flow of fluid under pressure of the reservoir from the opened end of the cable while maintaining the cable length filled with the fluid, thereafter joining the opened end of the cable length to another length of such fluid filled cable the remote end of which is connected to such an external reservoir, and thereafter disconnecting the external reservoir from the first mentioned cable length.

20. In the method of installing a length of sheathed cable filled with insulating fluid and having an external reservoir containing such fluid connected to one end thereof so as to create a pressure within the sheath of the cable superior to that of the atmosphere, those steps which consist in installing said cable length in place, and then opening the end of the cable length remote from said reservoir, permitting a reduced flow of fluid under pressure of the reservoir from the opened end of the cable while maintaining the cable length filled with the fluid, and thereafter joining the last mentioned end of the cable length to another length of such fluid filled cable.

21. The improvement in the art of installing oil-filled cable which consists in opening the sealed end of a detached length of oil-filled cable, maintaining a flow of oil under pressure from the so exposed body of cable insulation, and, while such flow continues, effecting electrical union with the cable conductor, and then applying a new oil-tight closure upon such union.

22. The improvement in the art of jointing two adjacent lengths of liquid insulated cable both of which are filled with liquid, which consists in removing the sheath from the adjacent ends of said lengths, maintaining a flow of liquid insulation under pressure from the so-exposed ends of the cable bodies, and, while such flow is maintained, effecting electrical union of the conductors of adjacent lengths and completing the joint structure about said union.

23. The method herein described of preparing a detached length of oil-filled cable for inclusion in an electric circuit which consists in first bringing another body of oil into continuity with the body of oil within the cable and then opening one of the cable ends, cutting back the envelope of insulation and the cable sheath from the protruding conductor end, and while flow of oil under pressure from the so exposed cable end continues effecting electrical union with the conductor end, and then effecting a new oil-tight closure upon such union.

24. The method of connecting into a cable system a detached length of oil-impregnated and oil-filled cable whose ends are sealed to prevent loss of oil and ingress of air and moisture, which method consists in first bringing a source of oil under pressure into continuity with the body of oil within the cable length, opening one of the sealed ends of the cable length to expose the insulated conductor, and then, while oil is escaping under pressure from the opened cable end, cutting back the cable sheath and the exposed insulation, effecting electrical union between the cable conductor and a conductor in the cable system, and effecting an oil tight closure about such union, thereby preventing ingress of air and moisture into the insulation of the cable length which would necessitate the reimpregnation and refilling of the installed cable length with oil.

25. The method of obviating the necessity of reimpregnating two newly connected lengths of cable each impregnated and filled with oil prior to and during the connecting operation and each sealed at its ends prior to the connecting operation to prevent loss of oil and ingress of air and moisture, which method comprises bringing a source of oil under pressure into continuity with the body of oil in one of the cable lengths, bringing a source of oil under pressure into continuity with the body of oil in the other cable length, opening one end of each of the cable lengths, effecting electrical union between the exposed conductor ends of the two cable lengths, applying an oil-tight closure about the connected cable ends, and maintaining a flow of oil from each of the opened cable ends throughout the jointing operation.

26. The improvement in the art of installing liquid insulated cable which consists in opening the end of a detached length of liquid-filled cable and thereby exposing the cable insulation to conditions of liquid escape, supplying liquid insulation under pressure to the interior of the cable length to replace the escaping liquid insulation, and applying a liquid-tight closure upon the opened cable end while such escape and replacement continues.

LUIGI EMANUELI.